United States Patent
Huang et al.

(10) Patent No.: US 12,432,287 B2
(45) Date of Patent: Sep. 30, 2025

(54) FOLDABLE ELECTRONIC DEVICE

(71) Applicant: SYNCMOLD ENTERPRISE CORP., New Taipei (TW)

(72) Inventors: Chun-Hao Huang, New Taipei (TW); Chien-Cheng Yeh, New Taipei (TW)

(73) Assignee: SYNCMOLD ENTERPRISE CORP., New Taipei (TW)

( * ) Notice: Subject to any disclaimer, the term of this patent is extended or adjusted under 35 U.S.C. 154(b) by 343 days.

(21) Appl. No.: 18/306,435

(22) Filed: Apr. 25, 2023

(65) Prior Publication Data
US 2024/0080382 A1 Mar. 7, 2024

Related U.S. Application Data

(60) Provisional application No. 63/403,187, filed on Sep. 1, 2022.

(30) Foreign Application Priority Data

Feb. 4, 2023 (TW) .................... 112104006

(51) Int. Cl.
*H04M 1/02* (2006.01)
(52) U.S. Cl.
CPC ....... *H04M 1/0216* (2013.01); *H04M 1/0268* (2013.01)
(58) Field of Classification Search
CPC .. H04M 1/0216; H04M 1/0268; H04M 1/022; H04M 1/0222; G06F 1/1681; G06F 1/1652; G06F 1/1641; H05K 5/0226
See application file for complete search history.

(56) References Cited

U.S. PATENT DOCUMENTS

| | | | | |
|---|---|---|---|---|
| 11,408,214 B1* | 8/2022 | Hsu | ................ | H04M 1/022 |
| 11,681,335 B1* | 6/2023 | Hsu | ................ | G06F 1/1681 |
| | | | | 361/679.01 |
| 12,169,425 B2* | 12/2024 | Zhang | .............. | H04M 1/022 |
| 12,316,791 B2* | 5/2025 | Liao | ................ | G06F 1/1681 |
| 2020/0267244 A1* | 8/2020 | Kim | ................ | G06F 1/1641 |
| 2020/0267856 A1* | 8/2020 | Hsu | ................ | G06F 1/1652 |

(Continued)

FOREIGN PATENT DOCUMENTS

CN 112333308 A 2/2021

*Primary Examiner* — Jinsong Hu
*Assistant Examiner* — Rui M Hu
(74) *Attorney, Agent, or Firm* — OSHA BERGMAN WATANABE & BURTON LLP

(57) ABSTRACT

A foldable electronic device is provided and includes a central base, a torque module, two wing members, two transmission members, two panel bodies, two connecting rods, two drop plates, a synchronous module and a flexible screen. The torque module is disposed on the central base, the wing members pivot relative to the central base, the transmission members are pivotally connected to the torque module and the central base, the panel bodies pivot relative to the wing members and linearly slide relative to the transmission members, the connecting rods pivot relative to the wing members, the drop plates pivot relative to the panel bodies and the connecting rods, the synchronous module drives the transmission members to reverse synchronously, and the flexible screen is arranged on the panel bodies, the drop plates and the wing members and includes a bendable area.

15 Claims, 18 Drawing Sheets

(56) References Cited

U.S. PATENT DOCUMENTS

| | | | | |
|---|---|---|---|---|
| 2020/0371553 | A1* | 11/2020 | Hsu | G06F 1/1624 |
| 2021/0055764 | A1* | 2/2021 | Chi | G06F 1/1647 |
| 2021/0333838 | A1* | 10/2021 | Song | G06F 1/1652 |
| 2022/0113770 | A1* | 4/2022 | Kang | H04M 1/022 |
| 2022/0120124 | A1* | 4/2022 | Quynh | E05D 3/122 |
| 2022/0141981 | A1* | 5/2022 | Hsu | H05K 5/0226 |
| | | | | 16/337 |
| 2022/0303371 | A1* | 9/2022 | Liao | H04M 1/0216 |
| 2022/0377919 | A1* | 11/2022 | Zhang | H04M 1/022 |
| 2022/0412138 | A1* | 12/2022 | Peng | E05D 3/122 |
| 2023/0050832 | A1* | 2/2023 | Yang | H04M 1/022 |
| 2023/0053947 | A1* | 2/2023 | Liu | G06F 1/1652 |
| 2023/0279898 | A1* | 9/2023 | Liu | H05K 5/0226 |
| | | | | 361/807 |
| 2023/0366248 | A1* | 11/2023 | Chung | E05D 3/122 |
| 2024/0007554 | A1* | 1/2024 | Cheng | H04M 1/0269 |
| 2024/0155791 | A1* | 5/2024 | Lee | G06F 1/1616 |
| 2024/0219973 | A1* | 7/2024 | Zhang | G06F 1/1616 |
| 2024/0241552 | A1* | 7/2024 | Zhang | G06F 1/16 |
| 2024/0314952 | A1* | 9/2024 | Park | G06F 1/1681 |
| 2024/0380829 | A1* | 11/2024 | Su | H04M 1/022 |
| 2024/0384750 | A1* | 11/2024 | Jiang | F16C 11/04 |
| 2024/0419221 | A1* | 12/2024 | Xu | H04M 1/0268 |
| 2024/0430348 | A1* | 12/2024 | Park | F16C 11/045 |
| 2025/0004508 | A1* | 1/2025 | Park | H04M 1/022 |
| 2025/0068214 | A1* | 2/2025 | Liu | G06F 1/16 |
| 2025/0133152 | A1* | 4/2025 | Liao | H04M 1/022 |

* cited by examiner

FOLDABLE ELECTRONIC DEVICE

CROSS-REFERENCE TO RELATED APPLICATION

This application claims the benefit of U.S. Provisional Application Ser. No. 63/403,187 filed on Sep. 1, 2022, and the benefit of Taiwan Patent Application Ser. No. 112104006 filed on Feb. 4, 2023. The entirety of each application is incorporated herein by reference.

BACKGROUND

1. Technical Field

The present disclosure relates to a foldable electronic device, and more particularly, to a foldable electronic device having a flexible screen.

2. Description of Related Art

CN112333308 discloses a folding device, including a connecting mechanism, two rotating mechanisms that are rotatably connected to the opposite sides of the connecting mechanism, and a supporting mechanism connected between the connecting mechanism and each rotating mechanism, wherein the supporting mechanism includes a support member and a link member movably connected to the support member, one end of the link member is rotatably connected to the connecting mechanism, and the other end is slidably connected to the rotating mechanism corresponding to the connecting mechanism, wherein the support member includes a supporting plate and a rotating portion arranged on the side of the supporting plate away from the connecting mechanism, and the rotating mechanism includes a fixed bracket and a rotating arm rotatably connected to the fixed bracket, wherein one end of the rotating arm away from the fixed bracket is rotatably connected to the connecting mechanism, the rotating portion and the fixed bracket are rotatably connected via the cooperation of an arc groove and an arc rail, the fixed bracket is provided with a guide groove for the link member to slide therein, the rotating mechanism rotates relative to the connecting mechanism to drive the link member to slide relative to the rotating mechanism and rotate relative to the connecting mechanism, and the rotating mechanism and the link member together drive two support members to be relatively flattened or relatively folded.

The folding device disclosed in the above-mentioned CN112333308 is of the Watt six-bar type. The present disclosure also provides a foldable electronic device that is different from Watt six-bar type.

SUMMARY

The present disclosure provides a foldable electronic device, comprising: a central base including a body portion, a track portion, at least one first inner arc-shaped slider and at least one second inner arc-shaped slider, wherein the track portion is formed by extending outward from the body portion, and the first inner arc-shaped slider and the second inner arc-shaped slider are respectively formed on the body portion and spaced apart from each other; a torque module disposed on the track portion; a first wing member including at least one first inner arc-shaped slideway, a first inner pivot joint and a first outer pivot joint, wherein the first inner arc-shaped slider is slidably disposed on the first inner arc-shaped slideway, whereby the first wing member is able to pivot relative to the body portion with a first inner virtual axis as a center; a first transmission member including a first rod, wherein the first rod is pivotally connected to the torque module and the body portion along a first axis; a first panel body including a first carrying member having a first pivoting portion, a first outer arc-shaped slideway and a first accommodation groove, wherein the first carrying member is able to linearly slide relative to the first transmission member, and wherein the first pivoting portion is pivotally connected to the first inner pivot joint and jointly defines a first inner pivot axis, and the first carrying member is able to rotate relative to the first wing member about the first inner pivot axis; a first connecting rod accommodated in the first accommodation groove and pivotally connected to the first outer pivot joint; a first drop plate pivotally carried on the first carrying member and the first connecting rod; a second wing member including at least one second inner arc-shaped slideway, a second inner pivot joint and a second outer pivot joint, wherein the second inner arc-shaped slider is slidably disposed on the second inner arc-shaped slideway, whereby the second wing member is able to pivot relative to the body portion with a second inner virtual axis as a center; a second transmission member including a second rod, wherein the second rod is pivotally connected to the torque module and the body portion along a second axis, and spaced apart from the first rod; a second panel body including a second carrying member having a second pivoting portion, a second outer arc-shaped slideway and a second accommodation groove, wherein the second carrying member is able to linearly slide relative to the second transmission member, and wherein the second pivoting portion is pivotally connected to the second inner pivot joint and jointly defines a second inner pivot axis, and the second carrying member is able to rotate relative to the second wing member about the second inner pivot axis; a second connecting rod accommodated in the second accommodation groove and pivotally connected to the second outer pivot joint; a second drop plate pivotally carried on the second carrying member and the second connecting rod; a synchronous module including a synchronous slider body slidably disposed between the first transmission member and the second transmission member, wherein the first transmission member and the second transmission member are respectively connected to the synchronous slider body, and the synchronous slider body is able to drive the first transmission member and the second transmission member to rotate synchronously and reversely when the synchronous slider body slides; and a flexible screen arranged on the first panel body, the second panel body, the first drop plate, the second drop plate and the central base, and including a bendable area; wherein the first panel body and the second panel body are able to transform between an unfolded state and a folded state, wherein when the first panel body and the second panel body are in the unfolded state, the flexible screen is flattened, and the first wing member, the second wing member, the first drop plate, the second drop plate and the central base jointly support the bendable area, and wherein when the first panel body and the second panel body are in the folded state, the bendable area of the flexible screen bends, and the first wing member, the second wing member, the first drop plate, the second drop plate and the central base jointly define an accommodating space for accommodating the bendable area.

In the aforementioned foldable electronic device, the body portion, the first wing member, the first transmission member, the first carrying member, the first connecting rod and the first drop plate substantially constitute a Stephenson II six-bar mechanism that applies sliding instead of rotating, and wherein the body portion, the second wing member, the second transmission member, the second carrying member, the second connecting rod and the second drop plate substantially constitute another Stephenson II six-bar mechanism that applies sliding instead of rotating.

In the aforementioned foldable electronic device, the first drop plate includes a first large arc-shaped slider and a first small arc-shaped slider, the first small arc-shaped slider is slidably disposed on the first outer arc-shaped slideway, the first connecting rod includes a first arc-shaped sliding groove portion and a first pivot portion, the first large arc-shaped slider is slidably disposed in the first arc-shaped sliding groove portion, the first pivot portion is pivotally connected to the first outer pivot joint, wherein the second drop plate includes a second large arc-shaped slider and a second small arc-shaped slider, the second small arc-shaped slider is slidably disposed on the second outer arc-shaped slideway, the second connecting rod includes a second arc-shaped sliding groove portion and a second pivot portion, the second large arc-shaped slider is slidably disposed in the second arc-shaped sliding groove portion, and the second pivot portion is pivotally connected to the second outer pivot joint.

In the aforementioned foldable electronic device, the first transmission member further includes a first bending plate and a first straight slider, the first bending plate is formed by bending and extending outward from the first rod along a radial direction of the first axis, the first straight slider is formed by extending outward from the first bending plate along a direction parallel to the first axis, the first carrying member further includes a first straight sliding groove extending substantially perpendicular to the first axis, and the first straight slider is slidably disposed in the first straight sliding groove, wherein the second transmission member further includes a second bending plate and a second straight slider, the second bending plate is formed by bending and extending outward from the second rod along a radial direction of the second axis, the second straight slider is formed by extending outward from the second bending plate along a direction parallel to the second axis, the second carrying member further includes a second straight sliding groove extending substantially perpendicular to the second axis, and the second straight slider is slidably disposed in the second straight sliding groove.

In the aforementioned foldable electronic device, the first outer pivot joint and the first pivot portion jointly define a first outer pivot axis, the first connecting rod rotates relative to the first wing member about the first outer pivot axis, the first outer arc-shaped slideway defines a first outer small virtual axis, the first arc-shaped sliding groove portion defines a first outer large virtual axis, the first drop plate rotates relative to the first carrying member and the first connecting rod about the first outer small virtual axis and the first outer large virtual axis respectively, wherein the second outer pivot joint and the second pivot portion jointly define a second outer pivot axis, the second connecting rod rotates relative to the second wing member about the second outer pivot axis, the second outer arc-shaped slideway defines a second outer small virtual axis, the second arc-shaped sliding groove portion defines a second outer large virtual axis, the second drop plate rotates relative to the second carrying member and the second connecting rod about the second outer small virtual axis and the second outer large virtual axis respectively, and wherein the first axis, the first inner virtual axis, the first inner pivot axis, the first outer pivot axis, the first outer small virtual axis, the first outer large virtual axis, the second axis, the second inner virtual axis, the second inner pivot axis, the second outer pivot axis, the second outer small virtual axis and the second outer large virtual axis are parallel to each other and do not overlap.

In the aforementioned foldable electronic device, the first accommodation groove is formed through in the radial direction of the first axis, the second accommodation groove is formed through in the radial direction of the second axis, a first distance is defined between the first axis and the first outer large virtual axis, a second distance is defined between the second axis and the second outer large virtual axis, wherein when the first carrying member and the second carrying member are transformed from the unfolded state to the folded state, the first arc-shaped sliding groove portion and the second arc-shaped sliding groove portion move linearly outward in the first accommodation groove and the second accommodation groove respectively, and the first distance and the second distance become larger, thereby moving the first drop plate and the second drop plate away from the central base.

In the aforementioned foldable electronic device, the torque module includes a fixed base, a first shaft hole and a second shaft hole, the fixed base has a first wing portion and a second wing portion, the first shaft hole is formed through the first wing portion along the first axis, and the second shaft hole is formed through the second wing portion along the second axis.

In the aforementioned foldable electronic device, the first rod has a first rod body, a first stop portion and a first extension post, the first stop portion is formed at one end of the first rod body and abuts against the first wing portion, the first extension post extends outward from the first stop portion and passes through the first shaft hole, and a cross-sectional area of the first stop portion is larger than a cross-sectional area of the first extension post, wherein the second rod has a second rod body, a second stop portion and a second extension post, the second stop portion is formed at one end of the second rod body and abuts against the second wing portion, the second extension post extends outward from the second stop portion and passes through the second shaft hole, and a cross-sectional area of the second stop portion is larger than a cross-sectional area of the second extension post.

In the aforementioned foldable electronic device, the torque module further includes a first stop washer, a plurality of first bowl-shaped washers, a second stop washer and a plurality of second bowl-shaped washers, the first stop washer is sleeved on the first extension post and moves together with the first extension post, the first bowl-shaped washers are sleeved on the first extension post and constantly provide a first elastic force, the first elastic force tends to make the first stop washer abut against the first wing portion, the second stop washer is sleeved on the second extension post and moves together with the second extension post, the second bowl-shaped washers are sleeved on the second extension post and constantly provide a second elastic force, and the second elastic force tends to make the second stop washer abut against the second wing portion.

In the aforementioned foldable electronic device, when the first panel body and the second panel body are in the unfolded state, the first carrying member and the second carrying member are substantially 180 degrees apart, wherein when the first panel body and the second panel body are in the folded state, the first carrying member and the second carrying member are substantially 0 degrees apart, and wherein when the first panel body and the second panel body are switched between the unfolded state and the folded state, the first transmission member and the second transmission member reverse synchronously, so that the first stop portion and the first stop washer simultaneously generate friction on opposite sides of the first wing portion, and the second stop portion and the second stop washer simultaneously generate friction on opposite sides of the second wing portion, such that the first carrying member and the second carrying member are able to stop at any position and sandwich an angle between 0 degrees and 180 degrees.

In the aforementioned foldable electronic device, the synchronous module further includes a first helical protrusion, a second helical protrusion, a first helical groove and a second helical groove, the first helical protrusion is matched to be accommodated in the first helical groove, and the second helical protrusion is matched to be accommodated in the second helical groove.

In the aforementioned foldable electronic device, the first helical groove is recessed and formed on the first rod along a first helical direction, the second helical groove is recessed and formed on the second rod along a second helical direction, and the first helical protrusion and the second helical protrusion are respectively formed on two opposite sides of the synchronous slider body.

In the aforementioned foldable electronic device, the first helical direction is opposite to the second helical direction.

In the aforementioned foldable electronic device, the central base further includes a track groove formed through the track portion, the synchronous module further includes a limiting rib formed on the synchronous slider body, and the limiting rib is slidably accommodated in the track groove.

In the aforementioned foldable electronic device, the first wing member further includes a first top surface, and the second wing member further includes a second top surface, wherein the first drop plate, the second drop plate, the first top surface, the second top surface and the central base are coplanar when the first panel body and the second panel body are in the unfolded state.

In the aforementioned foldable electronic device, the first wing member further includes a first arc surface angularly adjacent to the first top surface and bent in a direction away from the first axis, and the second wing member further includes a second arc surface angularly adjacent to the second top surface and bent in a direction away from the second axis, wherein when the first panel body and the second panel body are in the folded state, one end of the first drop plate adjacent to the first carrying member and one end of the second drop plate adjacent to the second carrying member are close to each other, and the first drop plate and the second drop plate are oblique to the central base respectively, and at the same time, together with the first arc surface, the second arc surface and the center base, surround and define the accommodating space in a water drop shape.

DETAILED DESCRIPTIONS

Figure 1:
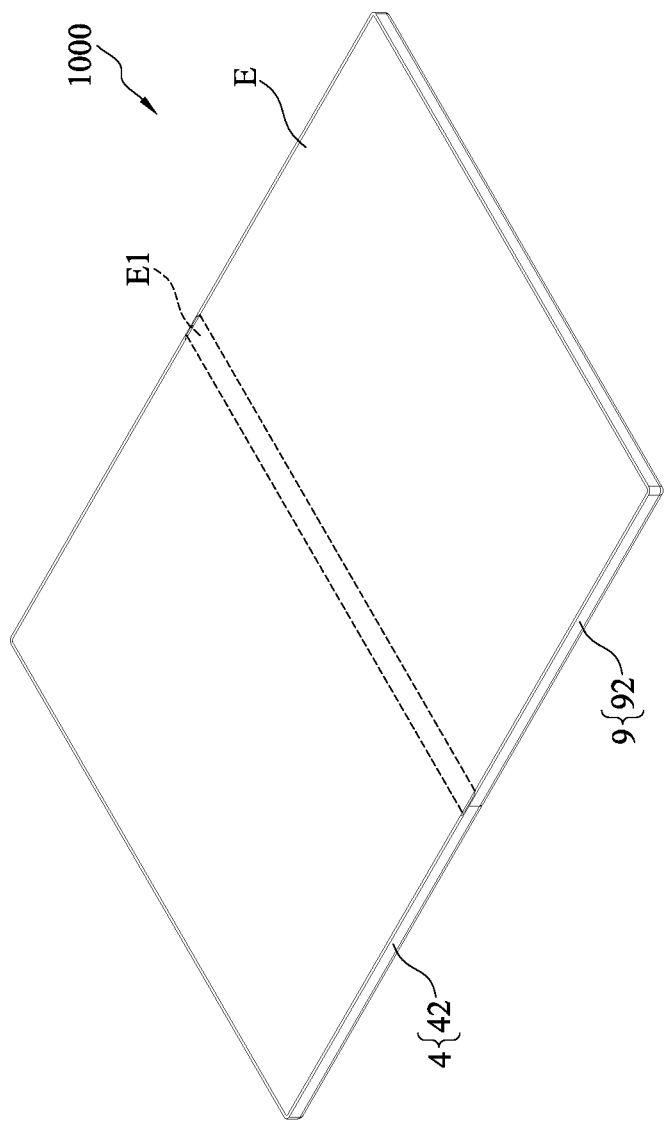
FIG. 1 is a schematic view of a foldable electronic device according to the present disclosure in an unfolded state.
Figure 2:
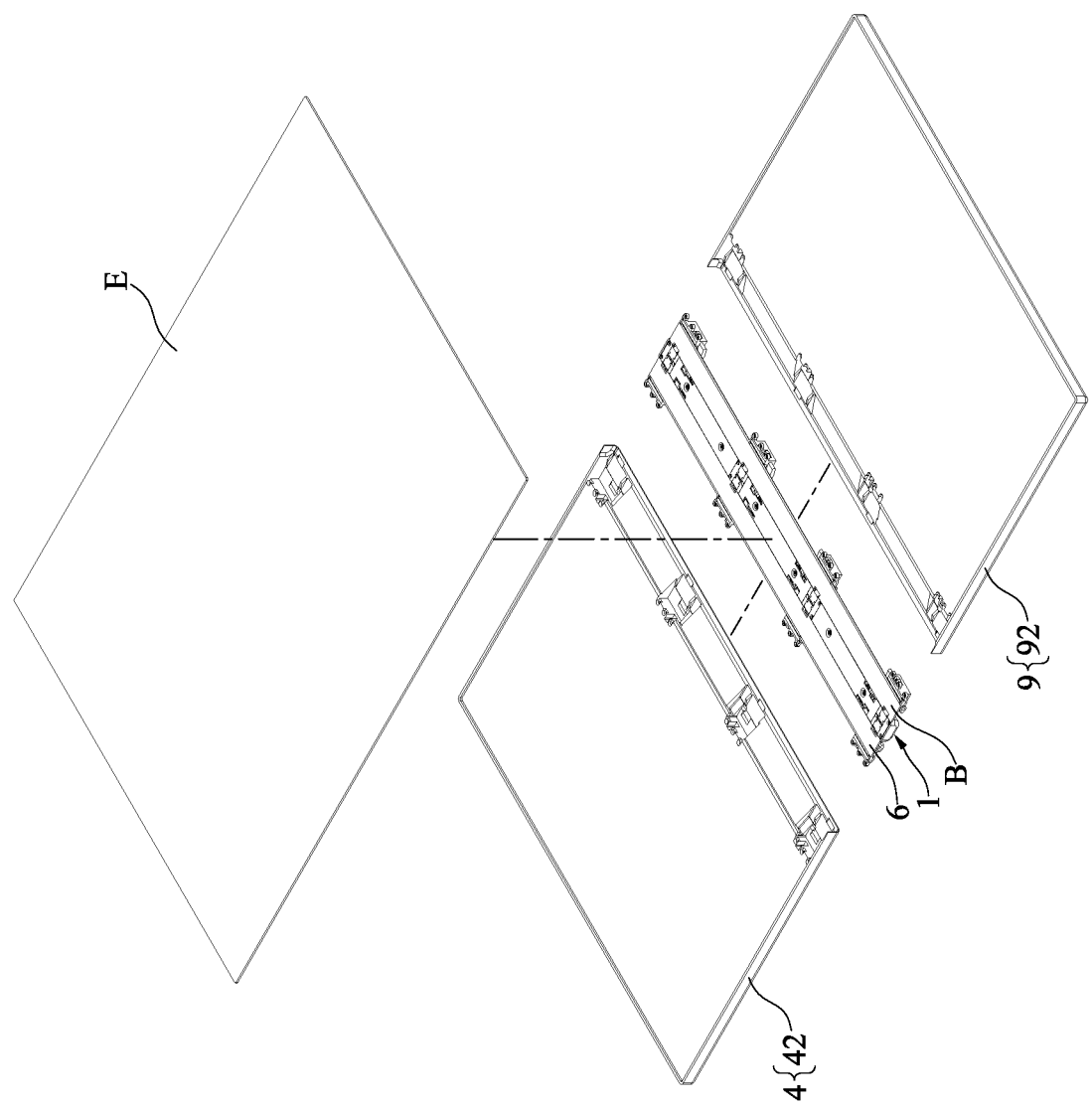
FIG. 2 is a schematic exploded view of the foldable electronic device according to the present disclosure in an unfolded state.
Figure 3:
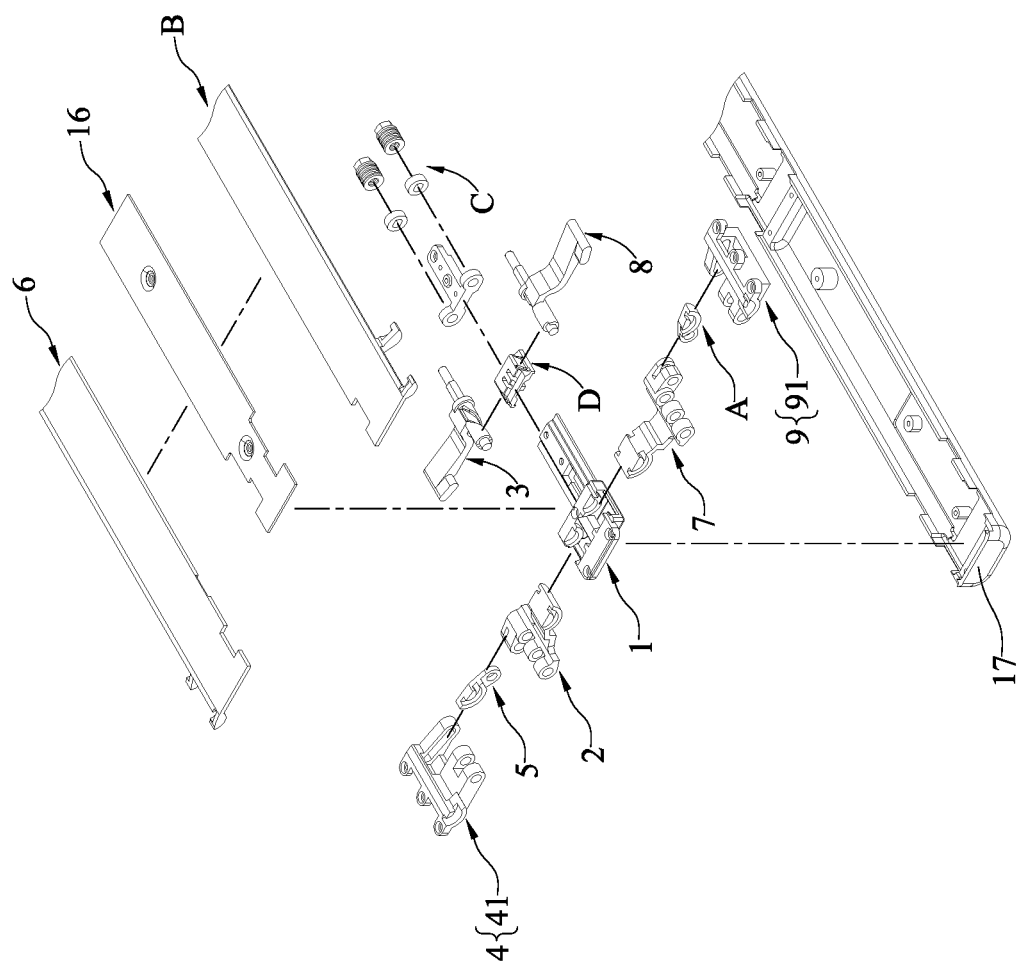
FIG. 3 is a schematic exploded view of some elements of the foldable electronic device according to the present disclosure.

Please refer to FIG. 1, FIG. 2 and FIG. 3, a foldable electronic device 1000 of the present disclosure includes a central base 1, a first wing member 2, a first transmission member 3, a first panel body 4, a first connecting rod 5, a first drop plate 6, a second wing member 7, a second transmission member 8, a second panel body 9, a second connecting rod A, a second drop plate B, a torque module C, a synchronous module D and a flexible screen E, wherein the first wing member 2 is pivotally connected to the central base 1, the first transmission member 3 is connected to the central base 1 and the torque module C, the first panel body 4 is connected to the first wing member 2, the first connecting rod 5 is pivotally connected to the first wing member 2, the first drop plate 6 is connected to the first panel body 4 and the first connecting rod 5, the second wing member 7 is pivotally connected to the central base 1, the second transmission member 8 is connected to the central base 1 and the torque module C, the second panel body 9 is connected to the second wing member 7, the second connecting rod A is pivotally connected to the second wing member 7, the second drop plate B is connected to the second panel body 9 and the second connecting rod A, the torque module C is disposed on the central base 1, the synchronous module D is slidably disposed between the first transmission member 3 and the second transmission member 8, and the flexible screen E is disposed on the first wing member 2, the first panel body 4, the first drop plate 6, the second wing member 7, the second panel body 9 and the second drop plate B. The structure of each element and the connection relationship between each other will be described in detail below, part of the drawings are drawn with a first inner pivot axis PXI1, a second inner pivot axis PXI2, a first outer pivot axis PXO1, a second outer pivot axis PXO2, a first inner virtual axis VXI1, a second inner virtual axis VXI2, a first outer small virtual axis VXS1, a first outer large virtual axis VXB1, a second outer small virtual axis VXS2, a second outer large virtual axis VXB2, a first axis X1 and a second axis X2, which are parallel to each other and do not overlap. It should be noted that some elements of the foldable electronic device 1000 of the present disclosure may be a group or a plurality of groups. However, whether it is one group or multiple groups, the action effect of the present disclosure can be achieved. The following is a simplified description, and only one group is used as an example.

Figure 4:
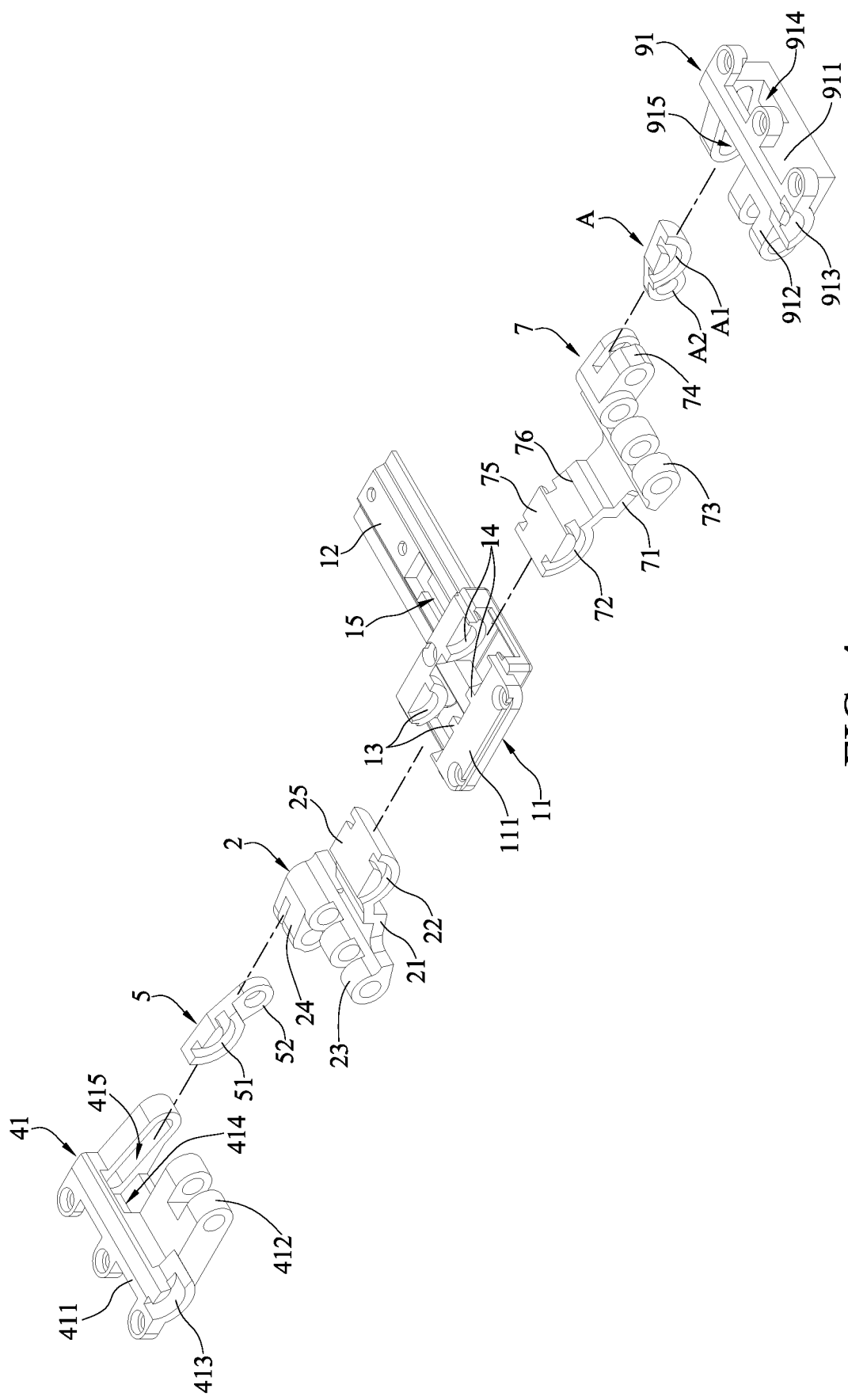
FIG. 4 and FIG. 5 are schematic exploded views of different viewing angles of a body portion, a first wing member, a first connecting rod, a first carrying member, a second wing member, a second connecting rod and a second carrying member of the foldable electronic device according to the present disclosure.
Figure 5:
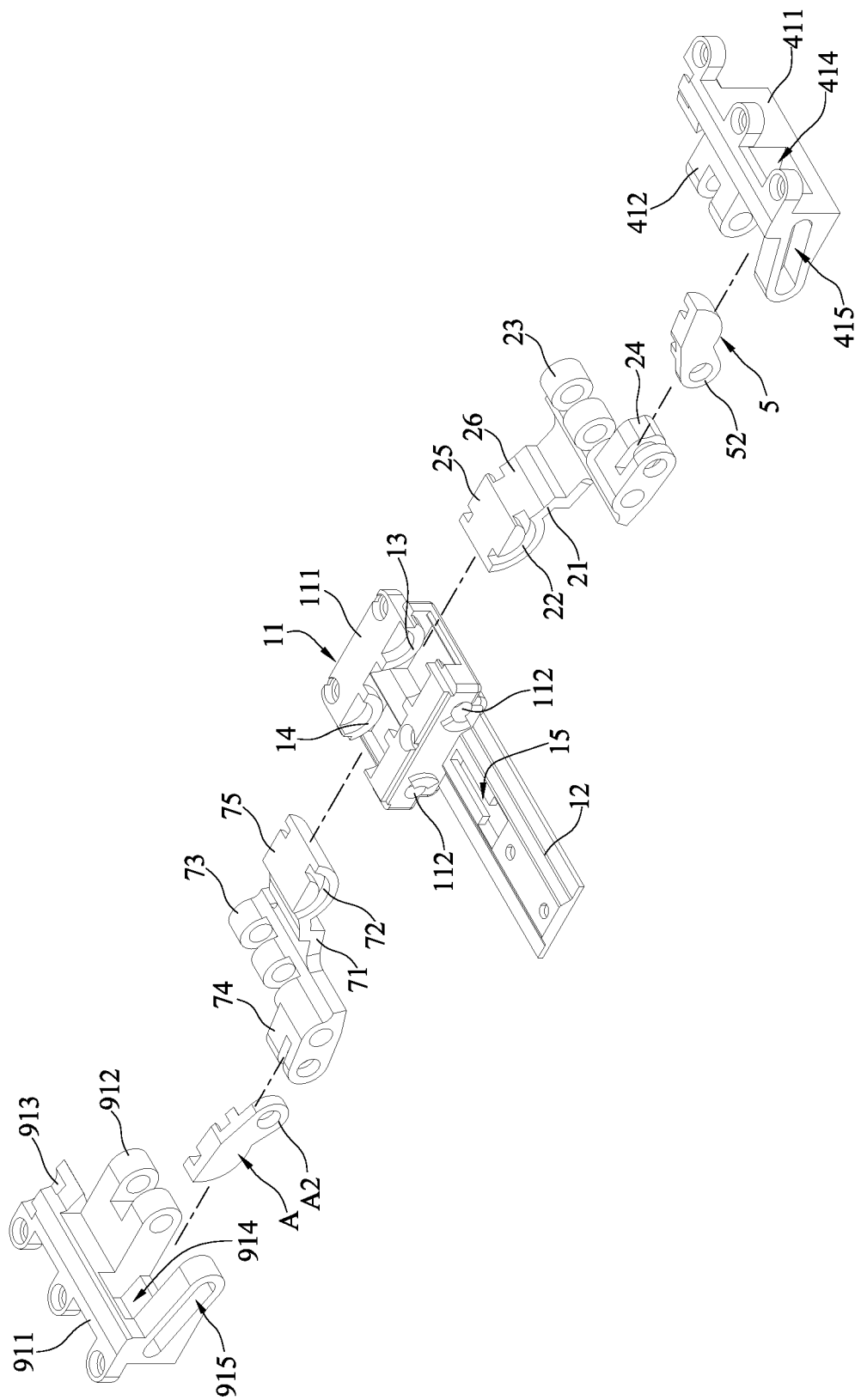
Figure 6:
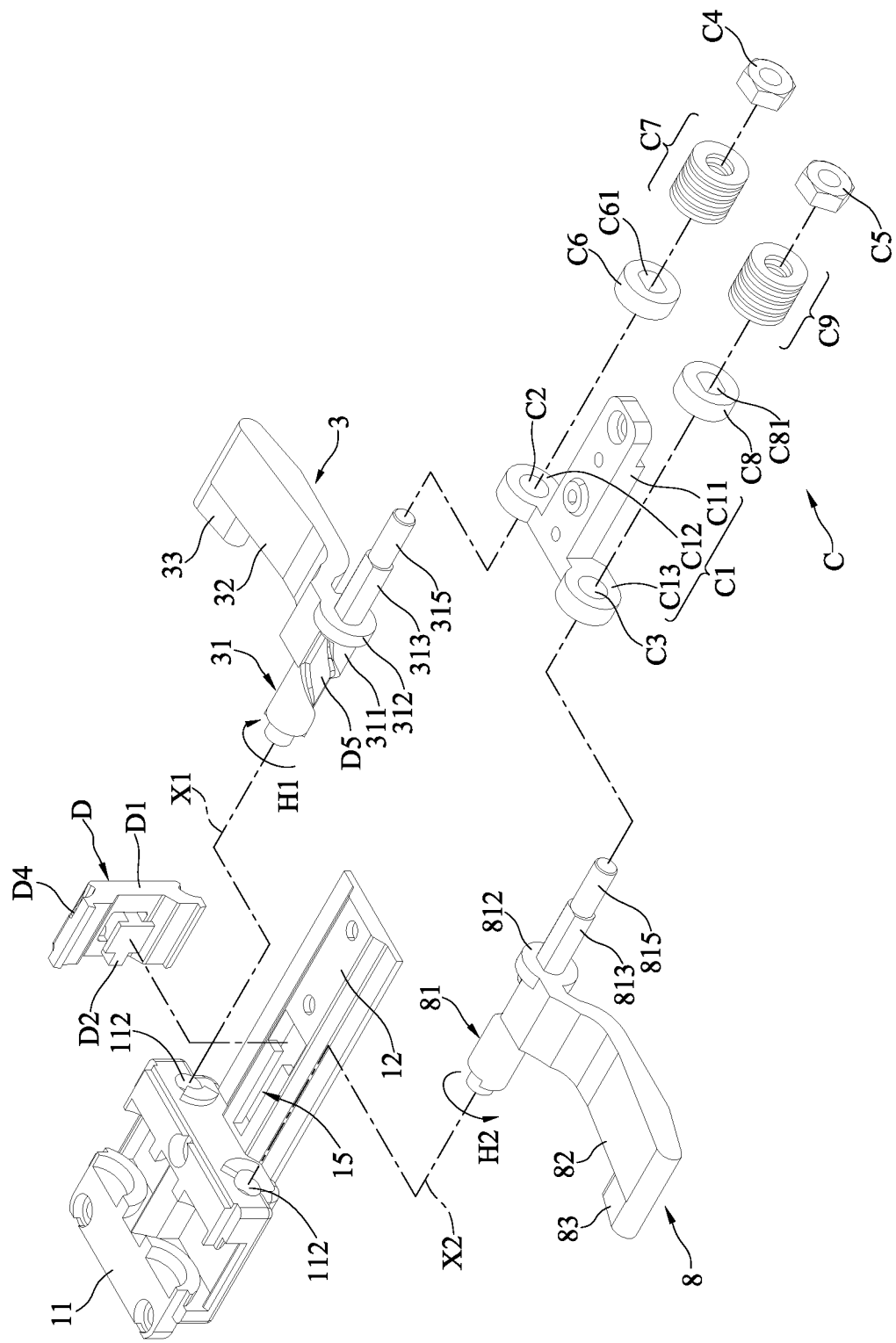
FIG. 6 is a schematic exploded view of a body portion, a first transmission member, a second transmission member, a torque module and a synchronous module of the foldable electronic device according to the present disclosure.
Figure 12:
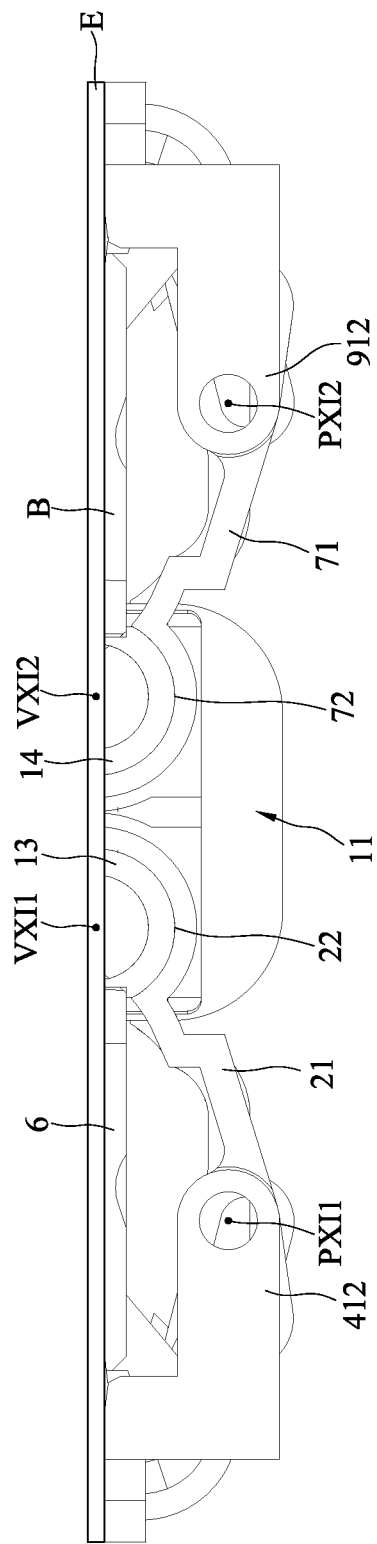
FIG. 12 is a schematic cross-sectional view of the foldable electronic device according to the present disclosure along the line B-B in FIG. 9.

Please refer to FIG. 4, FIG. 5 and FIG. 6, the central base 1 includes a body portion 11, a track portion 12, two first inner arc-shaped sliders 13, two second inner arc-shaped sliders 14, a track groove 15, a top plate 16 and a shell 17. The body portion 11 has an upper surface 111 and two shaft holes 112, and the shaft holes 112 are recessed along the first axis X1 and the second axis X2 respectively. The track portion 12 is generally in the shape of a long plate and is formed by extending outward from the body portion 11. The first inner arc-shaped sliders 13 are roughly semi-arc-shaped, protruding from the body portion 11 opposite to each other and spaced apart, and adjacent to one side of the body portion 11 (that is, adjacent to the first panel body 4), and its axis can be defined as the first inner virtual axis VXI1 (FIG. 12). The second inner arc-shaped sliders 14 are roughly semi-arc-shaped, protruding from the body portion 11 opposite to each other and spaced apart, and adjacent to the other side of the body portion 11 (that is, adjacent to the second panel body 9), and are spaced apart from the first inner arc-shaped sliders 13, and its axis can be defined as the second inner virtual axis VXI2 (FIG. 12). The track groove 15 is formed through the track portion 12 and extends along a direction parallel to the first axis X1 and the second axis X2. The top plate 16 is roughly rectangular, and is fixed on the upper surface 111 of the body portion 11 and the torque module C. The shell 17 covers the bottom and two sides of the body portion 11.

The first wing member 2 includes a first wing body 21, two first inner arc-shaped slideways 22, a first inner pivot joint 23, a first outer pivot joint 24, a first top surface 25 and a first arc surface 26. The first wing body 21 is roughly in the shape of a bent rectangle, wherein the first inner arc-shaped slideways 22 are recessed and formed on opposite sides of the first wing body 21 adjacent to the body portion 11 and spaced apart, and are respectively provided for sliding by the first inner arc-shaped sliders 13, whereby the first wing member 2 can pivot relative to the body portion 11 with the first inner virtual axis VXI1 as the center (FIG. 12). The first inner pivot joint 23 extends from the first wing body 21 in a direction away from the first inner arc-shaped slideway 22. The first outer pivot joint 24 extends outward from the first inner pivot joint 23. The first top surface 25 is formed on the first wing body 21 and is adjacent to the body portion 11. The first arc surface 26 is formed on the first wing body 21 and angularly adjacent to the first top surface 25, and is bent in a direction away from the first axis X1.

Figure 7:
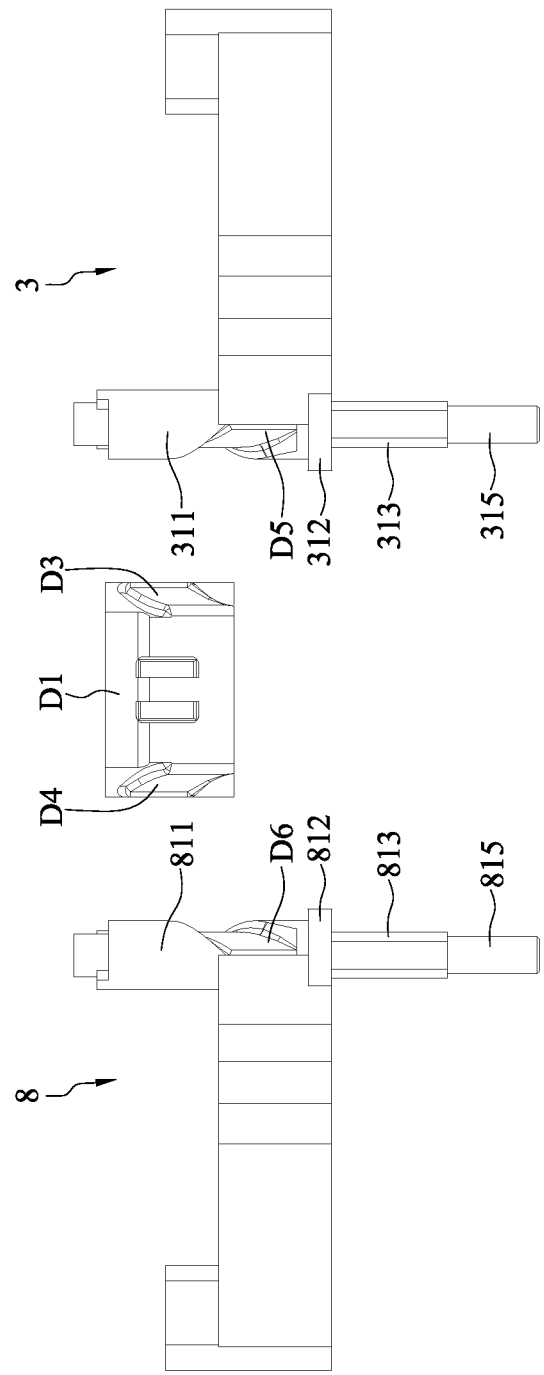
FIG. 7 is a top view of the first transmission member, the second transmission member and the synchronous module of the foldable electronic device according to the present disclosure.

Please refer to FIG. 6 and FIG. 7 at the same time. The first transmission member 3 includes a first rod 31, a first bending plate 32 and a first straight slider 33 integrally formed. The first rod 31 has a first rod body 311, a first stop portion 312, a first extension post 313 and a first locking post 315, wherein one end of the first rod body 311 is pivotally connected to one of the shaft holes 112 along the first axis X1, and the first stop portion 312 is formed on the other end of the first rod body 311, wherein the first extension post 313 is formed to extend outward from the first stop portion 312 along the first axis X1, has a cross-sectional area smaller than the cross-sectional area of the first stop portion 312, and has a non-circular cross-section. The first locking post 315 is formed to extend outward from the first extension post 313 along the first axis X1, has a cross-sectional area smaller than the cross-sectional area of the first extension post 313, and has a circular cross-section. The first bending plate 32 is formed to bend and extend outwards from the first rod body 311 along the radial direction of the first axis X1, and the first straight slider 33 is formed by extending outward from the first bending plate 32 along a direction parallel to the first axis X1, that is, both sides of the first bending plate 32 are respectively connected to the first rod body 311 and the first straight slider 33.

Figure 11:
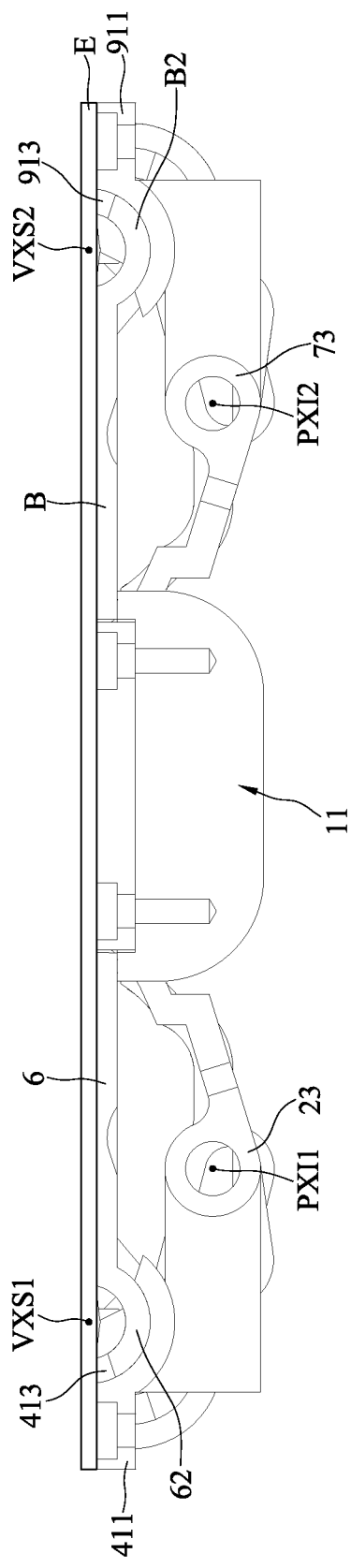
FIG. 11 is a schematic cross-sectional view of the foldable electronic device according to the present disclosure along the line A-A in FIG. 9.

The first panel body 4 includes a first carrying member 41 and a first panel shell 42, wherein the first carrying member 41 has a first carrier 411, a first pivoting portion 412, a first outer arc-shaped slideway 413, a first accommodation groove 414 and a first straight sliding groove 415, wherein the first pivoting portion 412 extends outward from the first carrier 411 and is pivotally connected to the first inner pivot joint 23, and the first pivoting portion 412 and the first inner pivot joint 23 jointly define the first inner pivot axis PXI1 (FIG. 12), whereby the first carrying member 41 can rotate relative to the first wing member 2 about the first inner pivot axis PXI1. The first outer arc-shaped slideway 413 is formed on the first carrier 411 and spaced apart from the first pivoting portion 412, and defines the first outer small virtual axis VXS1 (FIG. 11). The first accommodation groove 414 is surrounded and defined by the first carrier 411, is formed through in the radial direction of the first axis X1, and is located between the first pivoting portion 412 and the first straight sliding groove 415. The first straight sliding groove 415 is surrounded and defined by the first carrier 411, extends roughly perpendicular to the first axis X1, and is linearly slidable for the first straight slider 33 therein. The first panel shell 42 is roughly in the shape of a square, fixed on the first carrying member 41 and coplanar with the first top surface 25. In addition, the first panel body 4 also includes electronic elements, but since they are relatively irrelevant to the folding action, details will not be repeated here.

Figure 13:
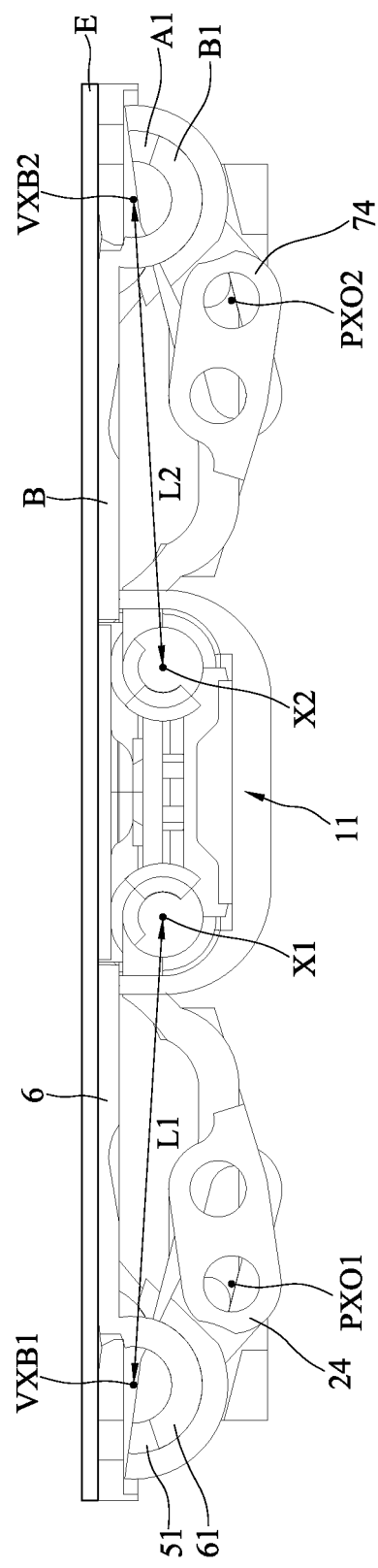
FIG. 13 is a schematic cross-sectional view of the foldable electronic device according to the present disclosure along the line C-C in FIG. 9.

The first connecting rod 5 includes a first arc-shaped sliding groove portion 51 and a first pivot portion 52 spaced apart from each other, wherein the first arc-shaped sliding groove portion 51 is accommodated in the first accommodation groove 414 and defines the first outer large virtual axis VXB1 (FIG. 13). The first pivot portion 52 is pivotally connected to the first outer pivot joint 24, and jointly defines the first outer pivot axis PXO1 (FIG. 13), whereby the first connecting rod 5 can rotate relative to the first wing member 2 about the first outer pivot axis PXO1.

Figure 8:
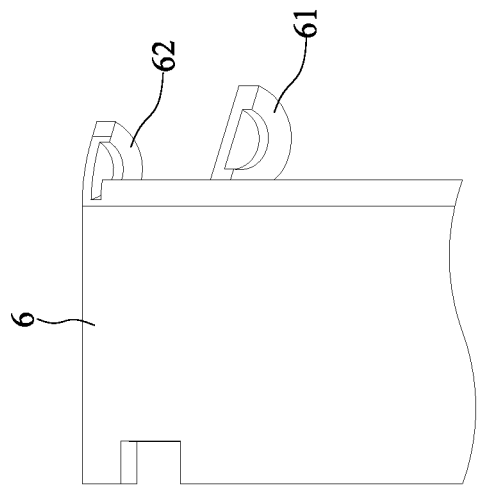
FIG. 8 is a schematic view of a first drop plate and a second drop plate of the foldable electronic device according to the present disclosure.
Figure 8:
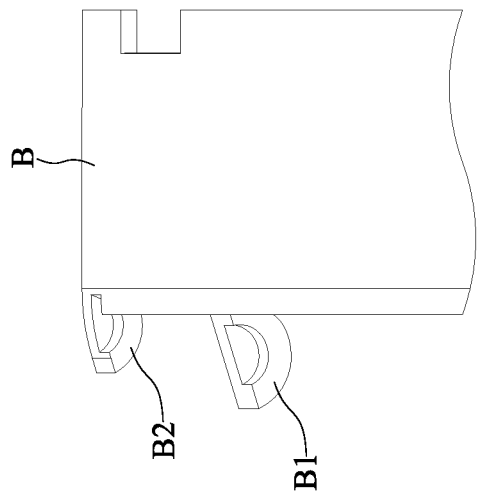
Figure 9:
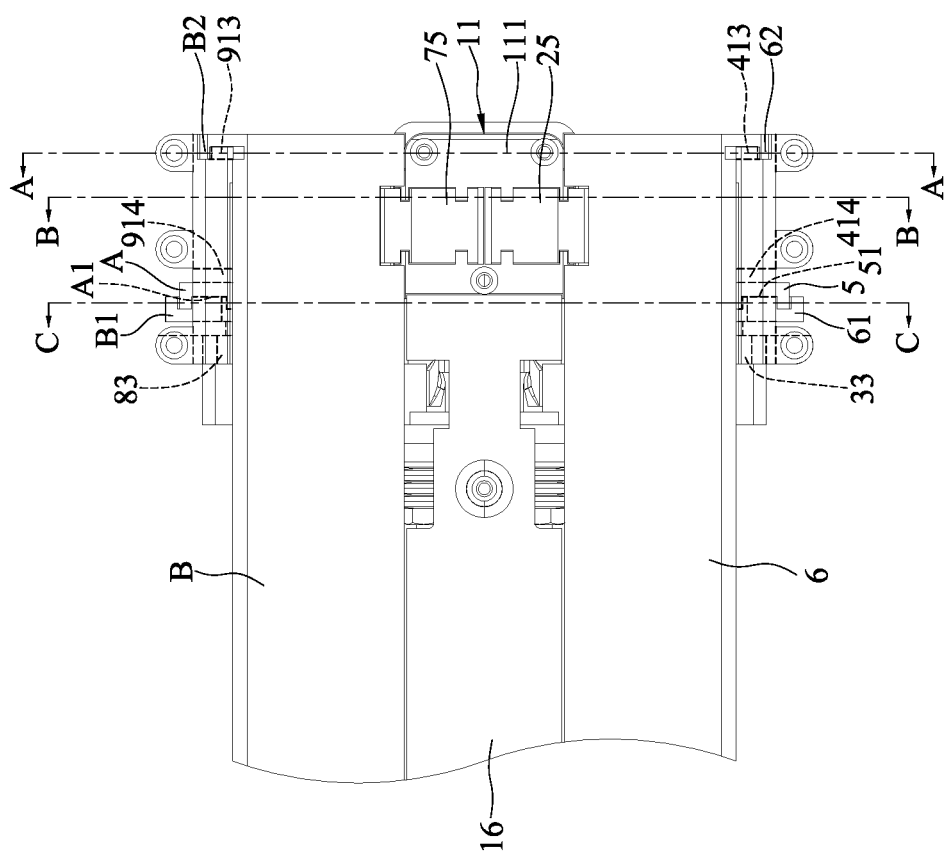
FIG. 9 is a partial top view of the foldable electronic device according to the present disclosure in an unfolded state.

Please refer to FIG. 8 and FIG. 9, the first drop plate 6 is pivotally carried on the first carrying member 41 and the first connecting rod 5, and includes a first large arc-shaped slider 61 and a first small arc-shaped slider 62, wherein the first large arc-shaped slider 61 is slidably disposed in the first arc-shaped sliding groove portion 51, and the first small arc-shaped slider 62 is slidably disposed on the first outer arc-shaped slideway 413. Accordingly, the first drop plate 6 can rotate relative to the first carrying member 41 about the first outer small virtual axis VXS1 (FIG. 11), and can rotate relative to the first connecting rod 5 about the first outer large virtual axis VXB1 (FIG. 13).

The second wing member 7 includes a second wing body 71, two second inner arc-shaped slideways 72, a second inner pivot joint 73, a second outer pivot joint 74, and a second top surface 75 and a second arc surface 76. The second wing body 71 is roughly in the shape of a bent rectangle, wherein the second inner arc-shaped slideways 72 are recessed and formed on opposite sides of the second wing body 71 adjacent to the body portion 11 and spaced apart, and are respectively provided for sliding by the second inner arc-shaped sliders 14, whereby the second wing member 7 can pivot relative to the body portion 11 with the second inner virtual axis VXI2 as the center (FIG. 12). The second inner pivot joint 73 extends outward from the second wing body 71. The second outer pivot joint 74 extends from the second inner pivot joint 73 in a direction away from the second inner arc-shaped slideway 72. The second top surface 75 is formed on the second wing body 71 and adjacent to the body portion 11. The second arc surface 76 is formed on the second wing body 71 and angularly adjacent to the second top surface 75, and is bent in a direction away from the second axis X2.

The second transmission member 8 is spaced apart from the first transmission member 3, and includes a second rod 81, a second bending plate 82 and a second straight slider 83 integrally formed. The second rod 81 has a second rod body 811, a second stop portion 812, a second extension post 813 and a second locking post 815, wherein one end of the second rod body 811 is pivotally connected to the other one of the shaft holes 112 along the second axis X2, and the second stop portion 812 is formed on the other end of the second rod body 811, wherein the second extension post 813 is formed to extend outward from the second stop portion 812 along the second axis X2, has a cross-sectional area smaller than the cross-sectional area of the second stop portion 812, and has a non-circular cross-section. The second locking post 815 is formed to extend outward from the second extension post 813 along the second axis X2, has a cross-sectional area smaller than the cross-sectional area of the second extension post 813, and has a circular cross-section. The second bending plate 82 is formed to bend and extend outwards from the second rod body 811 along the radial direction of the second axis X2, and the second straight slider 83 is formed by extending outward from the second bending plate 82 along a direction parallel to the second axis X2, that is, both sides of the second bending plate 82 are respectively connected to the second rod body 811 and the second straight slider 83.

The second panel body 9 is arranged opposite to the first panel body 4, and includes a second carrying member 91 and a second panel shell 92, wherein the second carrying member 91 has a second carrier 911, a second pivoting portion 912, a second outer arc-shaped slideway 913, a second accommodation groove 914 and a second straight sliding groove 915, wherein the second pivoting portion 912 extends outward from the second carrier 911 and is pivotally connected to the second inner pivot joint 73, and the second pivoting portion 912 and the second inner pivot joint 73 jointly define the second inner pivot axis PXI2 (FIG. 12), whereby the second carrying member 91 can rotate relative to the second wing member 7 about the second inner pivot axis PXI2. The second outer arc-shaped slideway 913 is formed on the second carrier 911 and spaced apart from the second pivoting portion 912, and defines the second outer small virtual axis VXS2 (FIG. 11). The second accommodation groove 914 is surrounded and defined by the second carrier 911, is formed through in the radial direction of the second axis X2, and is located between the second pivoting portion 912 and the second straight sliding groove 915. The second straight sliding groove 915 is surrounded and defined by the second carrier 911, extends roughly perpendicular to the second axis X2, and is linearly slidable for the second straight slider 83 therein. The second panel shell 92 is roughly in the shape of a square, fixed on the second carrying member 91 and coplanar with the second top surface 75. In addition, the second panel body 9 also includes electronic elements, but since they are relatively irrelevant to the folding action, details will not be repeated here.

The second connecting rod A includes a second arc-shaped sliding groove portion A1 and a second pivot portion A2 spaced apart from each other, wherein the second arc-shaped sliding groove portion A1 is accommodated in the second accommodation groove 914 and defines the second outer large virtual axis VXB2 (FIG. 13). The second pivot portion A2 is pivotally connected to the second outer pivot joint 74, and jointly defines the second outer pivot axis PXO2 (FIG. 13), whereby the second connecting rod A can rotate relative to the second wing member 7 about the second outer pivot axis PXO2.

The second drop plate B is pivotally carried on the second carrying member 91 and the second connecting rod A, and includes a second large arc-shaped slider B1 and a second small arc-shaped slider B2, wherein the second large arc-shaped slider B1 is slidably disposed in the second arc-shaped sliding groove portion A1, and the second small arc-shaped slider B2 is slidably disposed on the second outer arc-shaped slideway 913. Accordingly, the second drop plate B can rotate relative to the second carrying member 91 about the second outer small virtual axis VXS2 (FIG. 11), and can rotate relative to the second connecting rod A about the second outer large virtual axis VXB2 (FIG. 13).

The torque module C includes a fixed base C1, a first shaft hole C2, a second shaft hole C3, a first nut C4, a second nut C5, a first stop washer C6, a plurality of first bowl-shaped washers C7, a second stop washer C8 and a plurality of second bowl-shaped washers C9. The fixed base C1 has a base body C11, a first wing portion C12 and a second wing portion C13, wherein the base body C11 is roughly rectangular, and is disposed on the track portion 12 and exposes the track groove 15, and is spaced apart from the body portion 11. The first wing portion C12 and the second wing portion C13 extend outward from opposite sides of the base body C11 and are spaced apart from each other, and one side of the first wing portion C12 abuts against the first stop portion 312, and one side of the second wing portion C13 abuts against the second stop portion 812.

The first shaft hole C2 is formed through the first wing portion C12 along the first axis X1, and is used for the pivot connection of the first extension post 313, and has a cross-sectional area larger than the cross-sectional area of the first extension post 313. The second shaft hole C3 is formed through the second wing portion C13 along the second axis X2, and is used for the pivot connection of the second extension post 813, and has a cross-sectional area larger than the cross-sectional area of the second extension post 813.

The first nut C4 is screwed to the first locking post 315, and the second nut C5 is screwed to the second locking post 815.

The first stop washer C6 has a first through hole C61, and the first extension post 313 penetrates through the first through hole C61, wherein the cross-section of the first through hole C61 matches the cross-section of the first extension post 313 and is a non-circular cross-section, so that the first stop washer C6 is sleeved on the first extension post 313 and can move together with the first extension post 313. The first bowl-shaped washers C7 are sleeved on the first extension post 313 and are located between the first nut C4 and the first stop washer C6, and do not move together with the first extension post 313, and constantly provide a first elastic force, wherein the first elastic force tends to make the first stop washer C6 abut against the other side of the first wing portion C12, and the magnitude of the first elastic force can be changed by adjusting the distance between the first nut C4 and the first wing portion C12. The second stop washer C8 has a second through hole C81, and the second extension post 813 penetrates through the second through hole C81, wherein the cross-section of the second through hole C81 matches the cross-section of the second extension post 813 and is a non-circular cross-section, so that the second stop washer C8 is sleeved on the second extension post 813 and can move together with the second extension post 813. The second bowl-shaped washers C9 are sleeved on the second extension post 813 and are located between the second nut C5 and the second stop washer C8, and do not move with the second extension post 813, and constantly provide a second elastic force, wherein the second elastic force tends to make the second stop washer C8 abut against the other side of the second wing portion C13, and the magnitude of the second elastic force can be changed by adjusting the distance between the second nut C5 and the second wing portion C13.

The synchronous module D includes a synchronous slider body D1, a limiting rib D2, a first helical protrusion D3, a second helical protrusion D4, a first helical groove D5 and a second helical groove D6, wherein the synchronous slider body D1 is slidably disposed between the first transmission member 3 and the second transmission member 8 and on the track portion 12, and is connected with the first transmission member 3 and the second transmission member 8. The limiting rib D2 extends outward from the bottom surface of the synchronous slider body D1 and is slidably accommodated in the track groove 15, so that the synchronous slider body D1 can move along the track groove 15. The first helical protrusion D3 is formed on one of two opposite side surfaces of the synchronous slider body D1 along a first helical direction H1. The second helical protrusion D4 is formed on the other one of the two opposite sides of the synchronous slider body D1 along a second helical direction H2. The first helical groove D5 is recessed and formed on the first rod body 311 along the first helical direction H1, and is matched to receive the first helical protrusion D3 therein. The second helical groove D6 is recessed and formed on the second rod body 811 along the second helical direction H2, and is matched to receive the second helical protrusion D4 therein. In an embodiment, the first helical direction H1 and the second helical direction H2 are opposite. In other embodiments, the first helical groove D5 and the second helical groove D6 may also be recessed and formed on opposite sides of the synchronous slider body D1 respectively, and the first helical protrusion D3 and the second helical protrusion D4 can also be formed on the first rod body 311 and the second rod body 811 respectively, and the present disclosure is not limited thereto.

The flexible screen E is arranged on the first panel body 4, the second panel body 9, the first drop plate 6, the second drop plate B and the central base 1, and includes a bendable area E1, wherein the bendable area E1 roughly corresponds to the central base 1, the first arc surface 26, the second arc surface 76, the first drop plate 6 and the second drop plate B.

Figure 10:
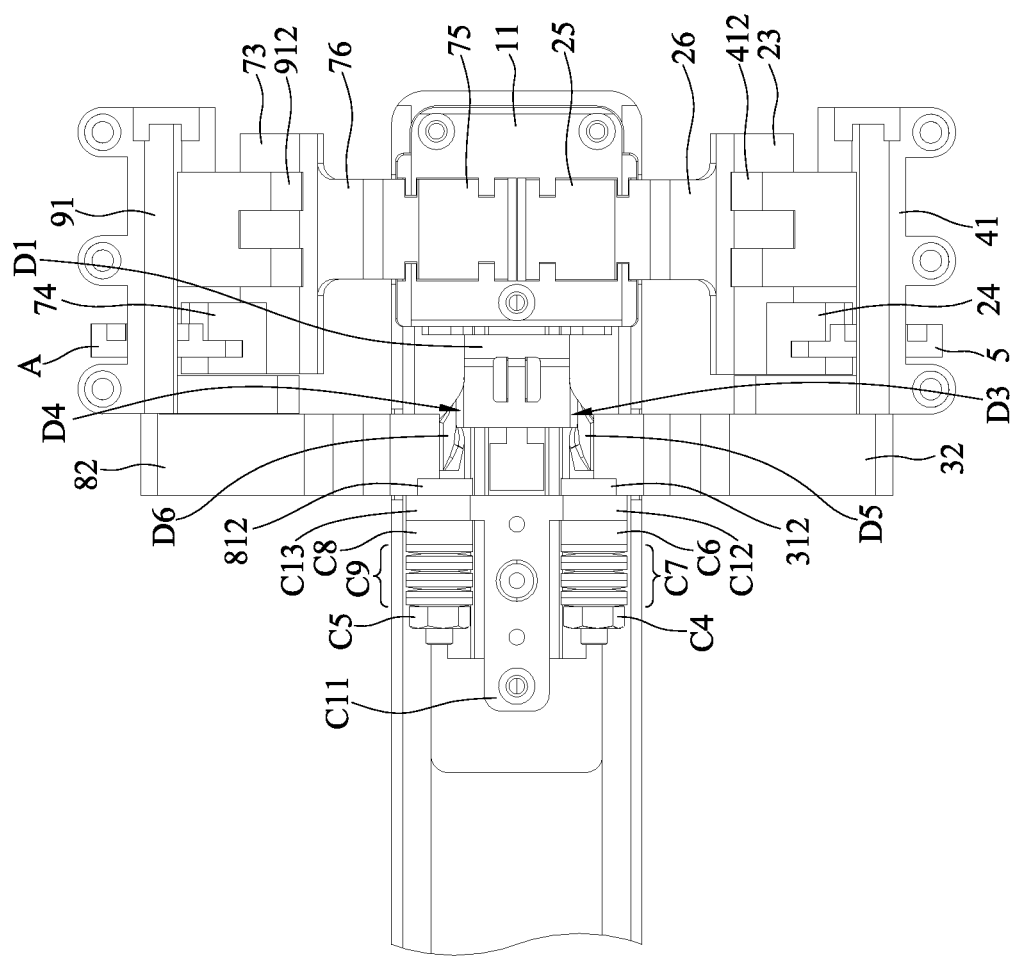
FIG. 10 is a top view of some elements of the foldable electronic device according to the present disclosure in an unfolded state.
Figure 14:
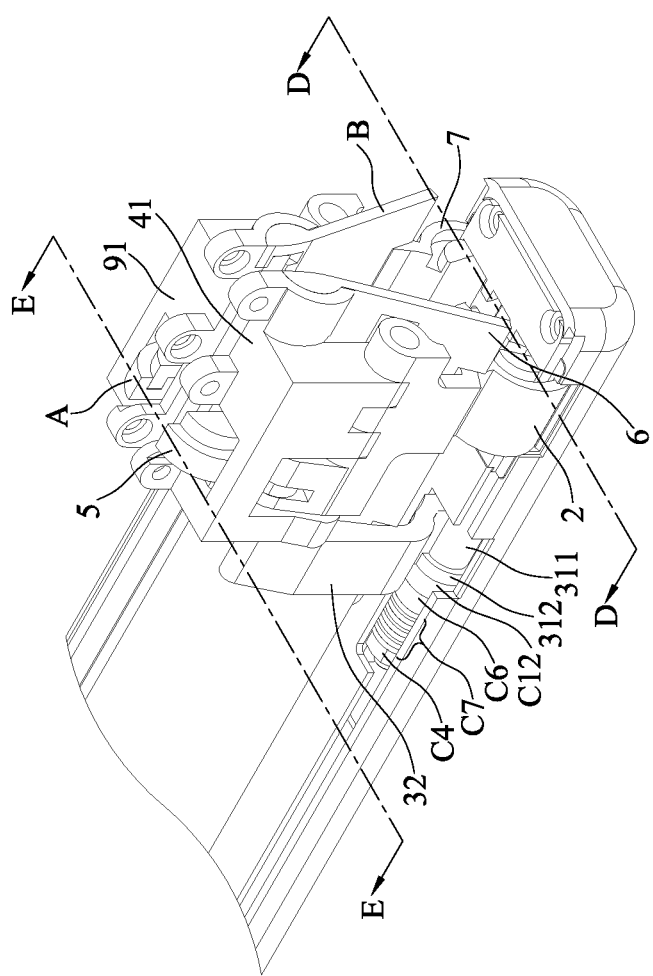
FIG. 14 is a schematic view of the foldable electronic device according to the present disclosure in a folded state.

The actuation of the foldable electronic device 1000 of the present disclosure is described below. The first panel body 4 and the second panel body 9 can be transformed between an unfolded state (as shown in FIG. 1, FIG. 9 and FIG. 10) and a folded state (as shown in FIG. 14). When the first panel body 4 and the second panel body 9 are in the unfolded state, the flexible screen E is flattened, wherein the first drop plate 6, the second drop plate B, the first top surface 25, the second top surface 75, the upper surface 111 of the body portion 11 and the top plate 16 are coplanar and jointly support the bendable area E1, and at this time, the first carrying member 41 and the second carrying member 91 are substantially 180 degrees apart.

When the first panel body 4 and the second panel body 9 are transformed from the unfolded state (FIG. 11, FIG. 12 and FIG. 13) to the folded state (FIG. 15 and FIG. 16), the first wing member 2 and the second wing member 7 pivot relative to the body portion 11 with the first inner virtual axis VXI1 and the second inner virtual axis VXI2 as the center respectively and make the first inner pivot joint 23 and the second inner pivot joint 73 approach each other gradually. The first carrying member 41 and the second carrying member 91 pivot and move relative to the first wing member 2 and the second wing member 7 with the first inner pivot axis PXI1 and the second inner pivot axis PXI2 as the center respectively, and at the same time, the first carrying member 41 and the second carrying member 91 pivot and move relative to the first drop plate 6 and the second drop plate B with the first outer small virtual axis VXS1 and the second outer small virtual axis VXS2 as the center respectively. The first connecting rod 5 and the second connecting rod A also pivot relative to the first wing member 2 and the second wing member 7 with the first outer pivot axis PXO1 and the second outer pivot axis PXO2 as the center respectively, and at the same time, the first connecting rod 5 and the second connecting rod A pivot relative to the first drop plate 6 and the second drop plate B with the first outer large virtual axis VXB1 and the second outer large virtual axis VXB2 as the center respectively. That is, a state where the upper surface of the first drop plate 6, the upper surface of the second drop plate B, the first top surface 25, the second top surface 75 and the upper surface 111 of the central base 1 are coplanar is gradually changed to a state where the first drop plate 6 and the second drop plate B are oblique to the first top surface 25 and the second top surface 75 respectively and the first top surface 25 and the second top surface 75 are oblique to the upper surface 111 of the central base 1 respectively. At this time, let the first straight slider 33 and the second straight slider 83 slide linearly in the first straight sliding groove 415 and the second straight sliding groove 915 respectively (slide from one end of the sliding groove to the other end), and at the same time, the first rod 31 and the second rod 81 are driven to pivot synchronously and reversely with the first axis X1 and the second axis X2 as the center respectively, wherein the first helical protrusion D3 and the second helical protrusion D4 also slide along the first helical groove D5 and the second helical groove D6 respectively, and the synchronous slider body D1 moves toward the fixed base C1 along the track groove 15 (as shown in FIG. 10 and FIG. 17).

Further, the above-mentioned first panel body 4 and the second panel body 9 are synchronized from the unfolded state to the folded state. Moreover, even when only the first panel body 4 is moved to pivot, the linear sliding of the first straight slider 33 in the first straight sliding groove 415 will drive the first rod 31 to pivot around the first axis X1, and jointly let the first helical protrusion D3 slide along the first helical groove D5, and drive the synchronous slider body D1 to move along the track groove 15 toward the fixed base C1 (as shown in FIG. 10 and FIG. 17). During the movement of the synchronous slider body D1, the second helical protrusion D4 will slide along the second helical groove D6, so that the second rod 81 pivots around the second axis X2 (rotates in the opposite direction to the first rod 31), and makes the second straight slider 83 linearly slide in the second straight sliding groove 915, thereby generating the above-mentioned linking movement and enabling the second panel body 9 to pivot synchronously. Similarly, if only the second panel body 9 is moved, the first panel body 4 will also pivot synchronously, and the relevant details will not be repeated here. During the transformation of the first panel body 4 and the second panel body 9 from the unfolded state to the folded state, the first rod 31 and the second rod 81 are synchronously and reversely pivoted to cause the first stop portion 312 and the first stop washer C6 simultaneously to generate friction on opposite sides of the first wing portion C12, and the second stop portion 812 and the second stop washer C8 also simultaneously generate friction on opposite sides of the second wing portion C13, so that the first carrying member 41 and the second carrying member 91 can stop at any arbitrary angle, and the arbitrary angle is between 0 degrees and 180 degrees.

In addition, when the first panel body 4 and the second panel body 9 are in the unfolded state, as shown in FIG. 13, a first distance L1 is defined between the first axis X1 and the first outer large virtual axis VXB1, and a second distance L2 is defined between the second axis X2 and the second outer large virtual axis VXB2. When the first panel body 4 and the second panel body 9 are in the folded state, as shown in FIG. 16, a first distance L1' is defined between the first axis X1 and the first outer large virtual axis VXB1, and a second distance L2' is defined between the second axis X2 and the second outer large virtual axis VXB2. When the first panel body 4 and the second panel body 9 are transformed from the unfolded state to the folded state, the first arc-shaped sliding groove portion 51 and the second arc-shaped sliding groove portion A1 linearly move outward in the first accommodation groove 414 and the second accommodation groove 914 respectively, wherein the first distance L1 is increased to the first distance L1', and the second distance L2 is increased to the second distance L2', thereby making the first drop plate 6 and the second drop plate B farther away from the central base 1.

Figure 15:
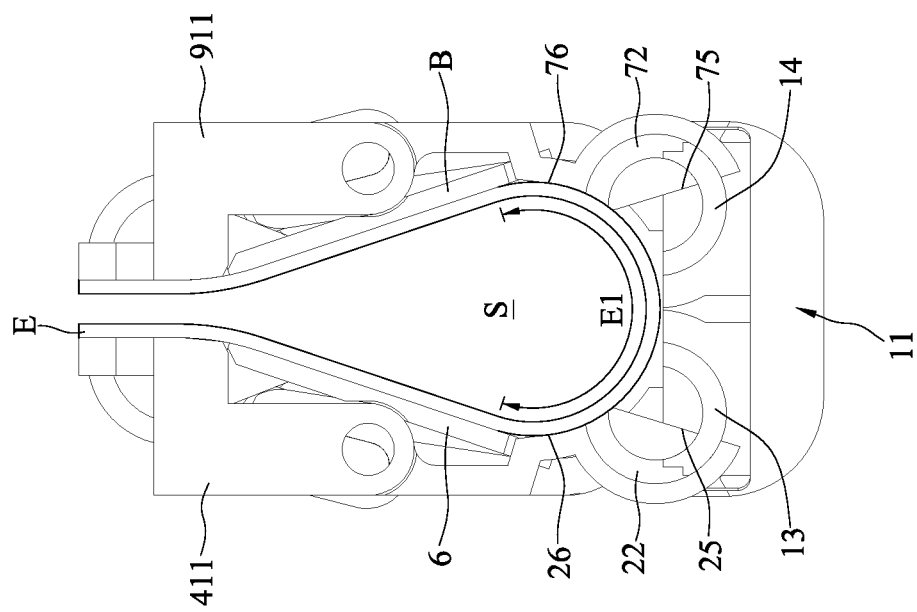
FIG. 15 is a schematic cross-sectional view of the foldable electronic device according to the present disclosure along the line D-D in FIG. 14.
Figure 16:
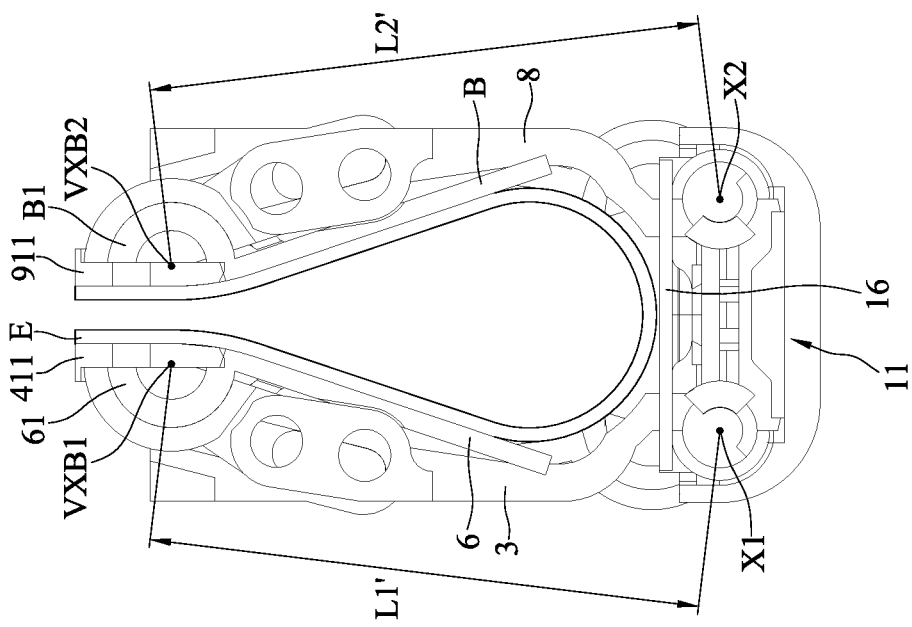
FIG. 16 is a schematic cross-sectional view of the foldable electronic device according to the present disclosure along the line E-E in FIG. 14.
Figure 17:
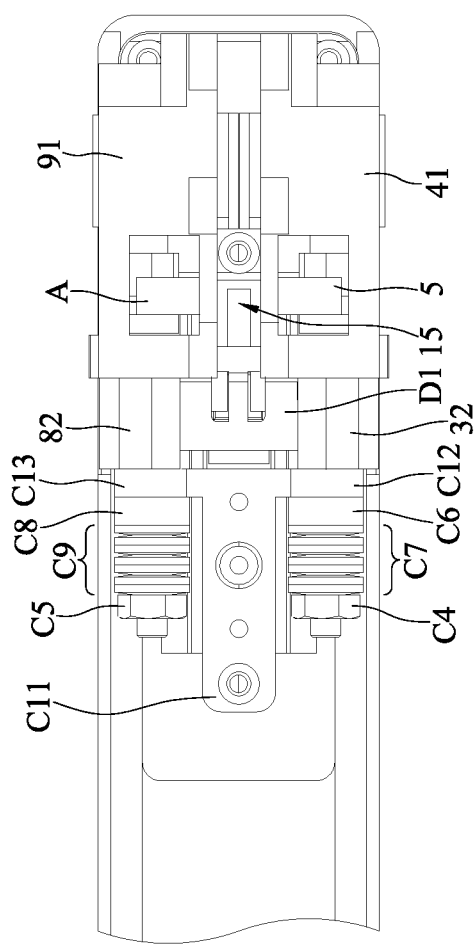
FIG. 17 is a top view of some elements of the foldable electronic device according to the present disclosure in a folded state.

Please refer to FIG. 15 and FIG. 16, when the first panel body 4 and the second panel body 9 are folded, the first drop plate 6 and the second drop plate B are oblique to the first top surface 25 and the second top surface 75 respectively, and the first top surface 25 and the second top surface 75 are oblique to the upper surface 111 of the central base 1 respectively. At this time, one end of the first drop plate 6 adjacent to the first carrying member 41 and one end of the second drop plate B adjacent to the second carrying member 91 are close to each other, and the first carrying member 41 and the second carrying member 91 are substantially 0 degrees apart, wherein the bendable area E1 of the flexible screen E bends, and the first wing member 2, the second wing member 7, the first drop plate 6, the second drop plate B, the body portion 11 of the central base 1 and the top plate 16 jointly define an accommodating space S for accommodating the bendable area E1. That is to say, since the first drop plate 6 and the second drop plate B are farther away from the central base 1, the flexible screen E is lifted up and away from the central base 1, thereby creating the space required for the bendable area E1 of the flexible screen E when it is bent. At this time, the first drop plate 6, the second drop plate B, the first arc surface 26, the second arc surface 76 and the central base 1 can be roughly in the shape of a water drop (that is, the accommodating space S is in the shape of a water drop), and the bendable area E1 can be partially attached to the first drop plate 6, the second drop plate B, the first arc surface 26, the second arc surface 76 and the central base 1.

Figure 18:
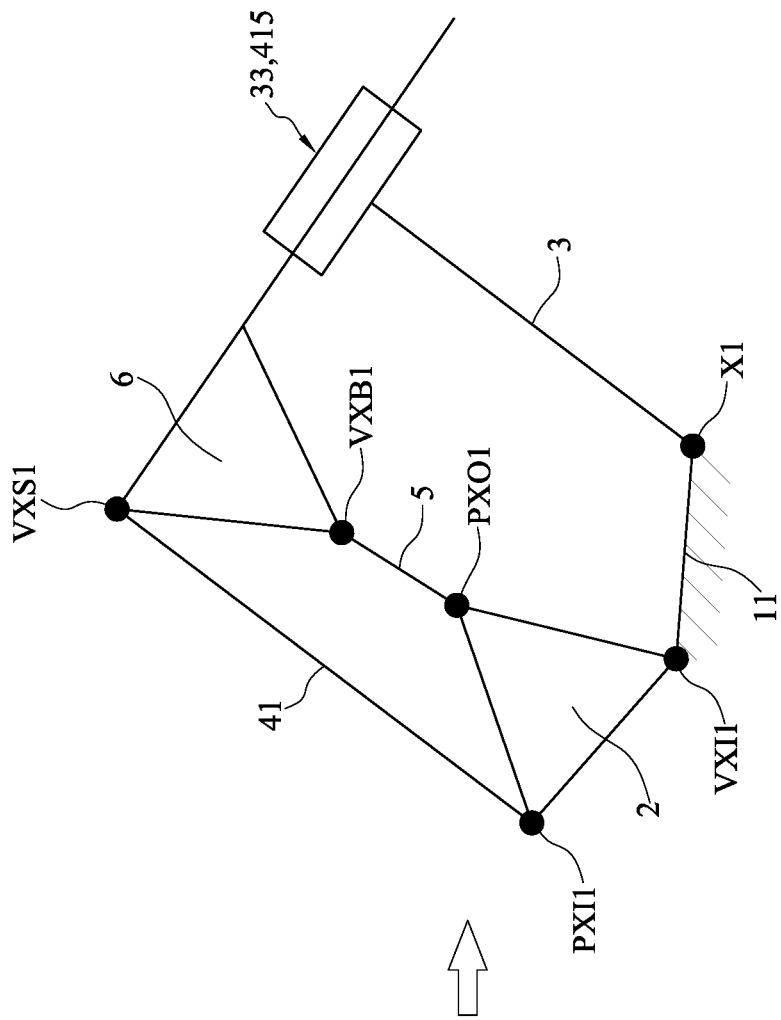
FIG. 18 is a comparison mechanism analysis view of the foldable electronic device according to the present disclosure improved from the prior art.
Figure 18:
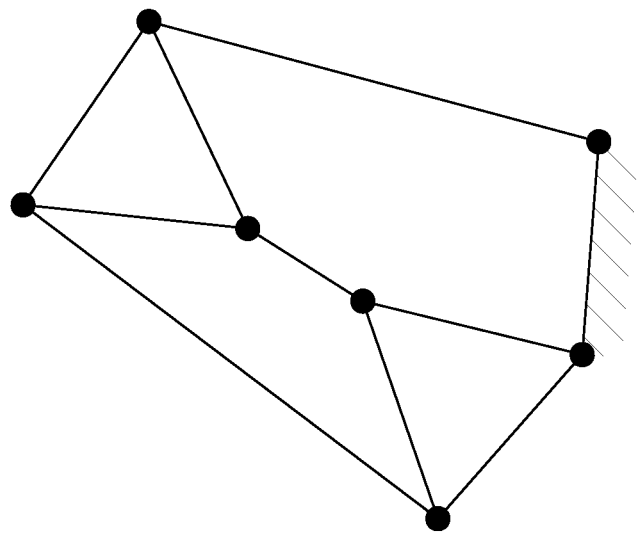

In addition, from a mechanical point of view, the present disclosure is improved from a Stephenson II six-bar mechanism. As shown in FIG. 18, the mechanism analysis diagram on the left is the Stephenson II six-bar mechanism, and the mechanism analysis diagram on the right is the present disclosure. In the present disclosure, one of the rotating pairs in the Stephenson II six-bar mechanism is turned into a sliding pair (corresponding to the combination of the first straight slider 33 and the first straight sliding groove 415). That is to say, the body portion 11, the first wing member 2, the first transmission member 3, the first carrying member 41, the first connecting rod 5 and the first drop plate 6 substantially constitute a Stephenson II six-bar mechanism that applies sliding instead of rotating, and the body portion 11, the second wing member 7, the second transmission member 8, the second carrying member 91, the second connecting rod A and the second drop plate B substantially constitute another Stephenson II six-bar mechanism that applies sliding instead of rotating.

To sum up, in the foldable electronic device of the present disclosure, the first wing member and the second wing member can pivot relative to the central base, and the first carrying member and the second carrying member can pivot relative to the first wing member and the second wing member respectively, wherein the first connecting rod and the second connecting rod can pivot relative to the first wing member and the second wing member respectively, and drive the first drop plate to pivot relative to the first carrying member and the first connecting rod respectively, and drive the second drop plate to pivot relative to the second carrying member and the second connecting rod respectively, and simultaneously drive the first transmission member and the second transmission member to linearly slide relative to the first carrying member and the second carrying member respectively, so as to let the first rod and the second rod reverse synchronously, so that the first wing member, the second wing member, the first drop plate, the second drop plate and the central base jointly support the bendable area of the flexible screen when the first panel body and the second panel body are in the unfolded state, and the first drop plate and the second drop plate are farther away from the central base when the first panel body and the second panel body are in the folded state, so that the flexible screen can be lifted up, thereby, together with the first wing member, the second wing member and the central base, a large enough accommodating space enough to accommodate the bendable area is effectively created.

What is claimed is:

1. A foldable electronic device, comprising:
a central base including a body portion, a track portion, at least one first inner arc-shaped slider and at least one second inner arc-shaped slider, wherein the track portion is formed by extending outward from the body portion, and the first inner arc-shaped slider and the second inner arc-shaped slider are respectively formed on the body portion and spaced apart from each other;

a torque module disposed on the track portion;

a first wing member including at least one first inner arc-shaped slideway, a first inner pivot joint and a first outer pivot joint, wherein the first inner arc-shaped slider is slidably disposed on the first inner arc-shaped slideway, whereby the first wing member is able to pivot relative to the body portion with a first inner virtual axis as a center;

a first transmission member including a first rod, wherein the first rod is pivotally connected to the torque module and the body portion along a first axis;

a first panel body including a first carrying member being able to linearly slide relative to the first transmission member and having a first pivoting portion, a first outer arc-shaped slideway and a first accommodation groove, wherein the first pivoting portion is pivotally connected to the first inner pivot joint and jointly defines a first inner pivot axis, and the first carrying member is able to rotate relative to the first wing member about the first inner pivot axis;

a first connecting rod accommodated in the first accommodation groove and pivotally connected to the first outer pivot joint;

a first drop plate pivotally carried on the first carrying member and the first connecting rod;

a second wing member including at least one second inner arc-shaped slideway, a second inner pivot joint and a second outer pivot joint, wherein the second inner arc-shaped slider is slidably disposed on the second inner arc-shaped slideway, whereby the second wing member is able to pivot relative to the body portion with a second inner virtual axis as a center;

a second transmission member including a second rod, wherein the second rod is pivotally connected to the torque module and the body portion along a second axis, and spaced apart from the first rod;

a second panel body including a second carrying member being able to linearly slide relative to the second transmission member and having a second pivoting portion, a second outer arc-shaped slideway and a second accommodation groove, wherein the second pivoting portion is pivotally connected to the second inner pivot joint and jointly defines a second inner pivot axis, and the second carrying member is able to rotate relative to the second wing member about the second inner pivot axis;

a second connecting rod accommodated in the second accommodation groove and pivotally connected to the second outer pivot joint;

a second drop plate pivotally carried on the second carrying member and the second connecting rod;

a synchronous module including a synchronous slider body slidably disposed between the first transmission member and the second transmission member, wherein the first transmission member and the second transmission member are respectively connected to the synchronous slider body, and the synchronous slider body is able to drive the first transmission member and the second transmission member to rotate synchronously and reversely when the synchronous slider body slides; and a flexible screen arranged on the first panel body, the second panel body, the first drop plate, the second drop plate and the central base, and including a bendable area;

wherein the first panel body and the second panel body are able to transform between an unfolded state and a folded state, wherein when the first panel body and the second panel body are in the unfolded state, the flexible screen is flattened, and the first wing member, the second wing member, the first drop plate, the second drop plate and the central base jointly support the bendable area, wherein when the first panel body and the second panel body are in the folded state, the bendable area of the flexible screen bends, and the first wing member, the second wing member, the first drop plate, the second drop plate and the central base jointly define an accommodating space for accommodating the bendable area, wherein the first drop plate includes a first large arc-shaped slider and a first small arc-shaped slider, the first small arc-shaped slider is slidably disposed on the first outer arc-shaped slideway, the first connecting rod includes a first arc-shaped sliding groove portion and a first pivot portion, the first large arc-shaped slider is slidably disposed in the first arc-shaped sliding groove portion, and the first pivot portion is pivotally connected to the first outer pivot joint, and wherein the second drop plate includes a second large arc-shaped slider and a second small arc-shaped slider, the second small arc-shaped slider is slidably disposed on the second outer arc-shaped slideway, the second connecting rod includes a second arc-shaped sliding groove portion and a second pivot portion, the second large arc-shaped slider is slidably disposed in the second arc-shaped sliding groove portion, and the second pivot portion is pivotally connected to the second outer pivot joint.

2. The foldable electronic device of claim 1, wherein the body portion, the first wing member, the first transmission member, the first carrying member, the first connecting rod and the first drop plate substantially constitute a Stephenson II six-bar mechanism that applies sliding instead of rotating, and wherein the body portion, the second wing member, the second transmission member, the second carrying member, the second connecting rod and the second drop plate substantially constitute another Stephenson II six-bar mechanism that applies sliding instead of rotating.

3. The foldable electronic device of claim 1, wherein the first transmission member further includes a first bending plate and a first straight slider, the first bending plate is formed by bending and extending outward from the first rod along a radial direction of the first axis, the first straight slider is formed by extending outward from the first bending plate along a direction parallel to the first axis, the first carrying member further includes a first straight sliding groove extending substantially perpendicular to the first axis, and the first straight slider is slidably disposed in the first straight sliding groove, and wherein the second transmission member further includes a second bending plate and a second straight slider, the second bending plate is formed by bending and extending outward from the second rod along a radial direction of the second axis, the second straight slider is formed by extending outward from the second bending plate along a direction parallel to the second axis, the second carrying member further includes a second straight sliding groove extending substantially perpendicular to the second axis, and the second straight slider is slidably disposed in the second straight sliding groove.

4. The foldable electronic device of claim 3, wherein the first outer pivot joint and the first pivot portion jointly define a first outer pivot axis, the first connecting rod rotates relative to the first wing member about the first outer pivot axis, the first outer arc-shaped slideway defines a first outer small virtual axis, the first arc-shaped sliding groove portion defines a first outer large virtual axis, and the first drop plate rotates relative to the first carrying member and the first connecting rod about the first outer small virtual axis and the first outer large virtual axis respectively, wherein the second outer pivot joint and the second pivot portion jointly define a second outer pivot axis, the second connecting rod rotates relative to the second wing member about the second outer pivot axis, the second outer arc-shaped slideway defines a second outer small virtual axis, the second arc-shaped sliding groove portion defines a second outer large virtual axis, and the second drop plate rotates relative to the second carrying member and the second connecting rod about the second outer small virtual axis and the second outer large virtual axis respectively, and wherein the first axis, the first inner virtual axis, the first inner pivot axis, the first outer pivot axis, the first outer small virtual axis, the first outer large virtual axis, the second axis, the second inner virtual axis, the second inner pivot axis, the second outer pivot axis, the second outer small virtual axis and the second outer large virtual axis are parallel to each other and do not overlap.

5. The foldable electronic device of claim 4, wherein the first accommodation groove is formed through in the radial direction of the first axis, the second accommodation groove is formed through in the radial direction of the second axis, a first distance is defined between the first axis and the first outer large virtual axis, and a second distance is defined between the second axis and the second outer large virtual axis, and wherein when the first carrying member and the second carrying member are transformed from the unfolded state to the folded state, the first arc-shaped sliding groove portion and the second arc-shaped sliding groove portion move linearly outward in the first accommodation groove and the second accommodation groove respectively, and the first distance and the second distance become larger, thereby driving the first drop plate and the second drop plate away from the central base.

6. The foldable electronic device of claim 5, wherein the torque module includes a fixed base, a first shaft hole and a second shaft hole, the fixed base has a first wing portion and a second wing portion, the first shaft hole is formed through the first wing portion along the first axis, and the second shaft hole is formed through the second wing portion along the second axis.

7. The foldable electronic device of claim 6, wherein the first rod has a first rod body, a first stop portion and a first extension post, the first stop portion is formed at one end of the first rod body and abuts against the first wing portion, the first extension post extends outward from the first stop portion and passes through the first shaft hole, and a cross-sectional area of the first stop portion is larger than a cross-sectional area of the first extension post, and wherein the second rod has a second rod body, a second stop portion and a second extension post, the second stop portion is formed at one end of the second rod body and abuts against the second wing portion, the second extension post extends outward from the second stop portion and passes through the second shaft hole, and a cross-sectional area of the second stop portion is larger than a cross-sectional area of the second extension post.

8. The foldable electronic device of claim 7, wherein the torque module further includes a first stop washer, a plurality of first bowl-shaped washers, a second stop washer and a plurality of second bowl-shaped washers, the first stop washer is sleeved on the first extension post and moves together with the first extension post, the first bowl-shaped washers are sleeved on the first extension post and constantly provide a first elastic force, the first elastic force tends to make the first stop washer abut against the first wing portion, the second stop washer is sleeved on the second extension post and moves together with the second extension post, the second bowl-shaped washers are sleeved on the second extension post and constantly provide a second elastic force, and the second elastic force tends to make the second stop washer abut against the second wing portion.

9. The foldable electronic device of claim 8, wherein when the first panel body and the second panel body are in the unfolded state, the first carrying member and the second carrying member are substantially 180 degrees apart, wherein when the first panel body and the second panel body are in the folded state, the first carrying member and the second carrying member are substantially 0 degrees apart, and wherein when the first panel body and the second panel body are switched between the unfolded state and the folded state, the first transmission member and the second transmission member reverse synchronously, and the first stop portion and the first stop washer simultaneously generate friction on opposite sides of the first wing portion, and the second stop portion and the second stop washer simultaneously generate friction on opposite sides of the second wing portion, such that the first carrying member and the second carrying member are able to stop at any position and sandwich an angle between 0 degrees and 180 degrees.

10. The foldable electronic device of claim 1, wherein the synchronous module further includes a first helical protrusion, a second helical protrusion, a first helical groove and a second helical groove, the first helical protrusion is matched to be accommodated in the first helical groove, and the second helical protrusion is matched to be accommodated in the second helical groove.

11. The foldable electronic device of claim 10, wherein the first helical groove is recessed and formed on the first rod along a first helical direction, the second helical groove is recessed and formed on the second rod along a second helical direction, and the first helical protrusion and the second helical protrusion are respectively formed on two opposite sides of the synchronous slider body.

12. The foldable electronic device of claim 11, wherein the first helical direction is opposite to the second helical direction.

13. The foldable electronic device of claim 12, wherein the central base further includes a track groove formed through the track portion, the synchronous module further includes a limiting rib formed on the synchronous slider body, and the limiting rib is slidably accommodated in the track groove.

14. The foldable electronic device of claim 13, wherein the first wing member further includes a first top surface, and the second wing member further includes a second top surface, and wherein the first drop plate, the second drop plate, the first top surface, the second top surface and the central base are coplanar when the first panel body and the second panel body are in the unfolded state.

15. The foldable electronic device of claim 14, wherein the first wing member further includes a first arc surface angularly adjacent to the first top surface and bent in a direction away from the first axis, and the second wing member further includes a second arc surface angularly adjacent to the second top surface and bent in a direction away from the second axis, and wherein when the first panel body and the second panel body are in the folded state, one end of the first drop plate adjacent to the first carrying member and one end of the second drop plate adjacent to the second carrying member are close to each other, and the first drop plate and the second drop plate are oblique to the central base respectively, and thus, together with the first arc surface, the second arc surface and the center base, surround and define the accommodating space in a water drop shape.

\* \* \* \* \*